United States Patent [19]

Book

[11] 4,107,524
[45] Aug. 15, 1978

[54] HIGH ATOMIC WEIGHT ISOTOPE SEPARATOR

[76] Inventor: David L. Book, 3001 Ordway St., Washington, D.C. 20008

[21] Appl. No.: 637,562

[22] Filed: Dec. 4, 1975

[51] Int. Cl.$^2$ ............................................. H01J 39/00
[52] U.S. Cl. ................................. 250/282; 250/283; 250/423 P
[58] Field of Search .................... 250/423 P, 282, 294, 250/283

[56] References Cited

U.S. PATENT DOCUMENTS

| | | | |
|---|---|---|---|
| 3,443,087 | 5/1969 | Robieux et al. | 250/423 P |
| 3,772,519 | 11/1973 | Levy et al. | 250/423 P |
| 3,939,354 | 2/1976 | Janes | 250/423 P |
| 3,940,615 | 2/1976 | Kantrowitz | 250/423 P |
| 3,944,825 | 3/1976 | Levy et al. | 250/423 P |

FOREIGN PATENT DOCUMENTS 2,312,194 10/1973 Fed. Rep. of Germany ....... 250/423 P

OTHER PUBLICATIONS

"The Application of Lasers to Isotope Separation", Moore, Accounts of Chem. Research, vol. 6, pp. 323–328, 1973.

Primary Examiner—Alfred E. Smith
Assistant Examiner—B. C. Anderson
Attorney, Agent, or Firm—R. S. Sciascia; Philip Schneider; Melvin L. Crane

[57] ABSTRACT

A method of separating one isotopic species of a given element from a mixture. Collisionless plasma instabilities slow down the ions and oppositely charged electrodes separate the isotopes.

3 Claims, 3 Drawing Figures

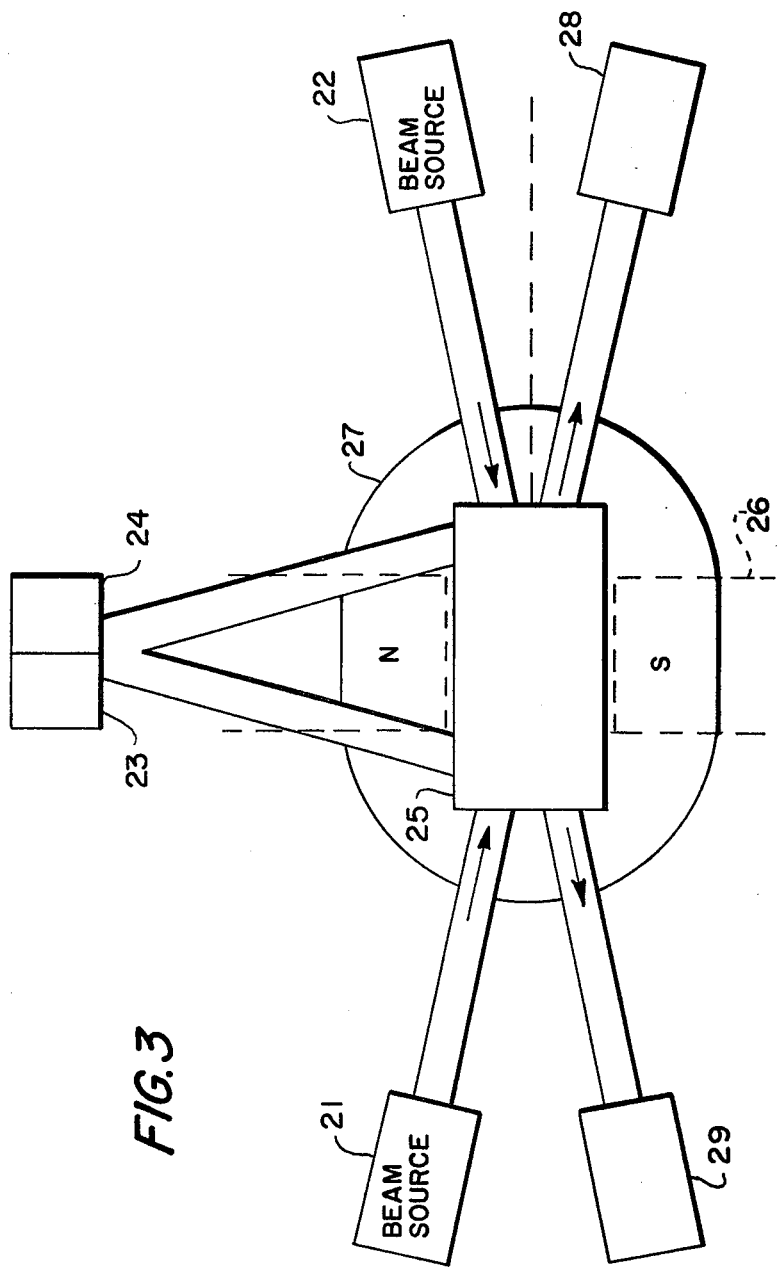

HIGH ATOMIC WEIGHT ISOTOPE SEPARATOR

BACKGROUND OF THE INVENTION

This invention relates to isotope separation, more particularly to isotope separation using collisionless magneto-plasma instabilities to slow down ions of a desired species from two counterstreaming, initially neutral beams by which one isotopic species of a given element may be separated from a mixture.

Heretofore other systems, principally gaseous diffusion and centrifuge techniques, have been used to separate isotopes. Such devices involve enormous capital and/or operating expenses, and can be economically justified only in very large scale plants. The reason for this lies in the fact that such techniques exploit the small (typically 1%) difference in the physical masses of the differing isotopes. No absolute separation is in general possible, only a preferential enrichment of one desired isotope. To obtain high concentrations of the latter, requires that the enriched output be recycled many times.

SUMMARY OF THE INVENTION

A continuously operating device which separates one isotopic species of a given element from a mixture. The given element is vaporized and formed into a neutral beam containing the isotopes desired to be separated. The plasma is accelerated through a laser beam which is formed by two separate lasers which operate in the continuous wave mode in which the beams are as nearly as possible in the same beam path. The two laser output beams excite and ionize the isotope of interest while leaving the remaining atoms unaffected. The ionized isotopes are then separated from the beam by an electrostatic deflection technique and the unaffected atoms continue on in their path and are directed to a recovery device.

BRIEF DESCRIPTION OF THE DRAWINGS

FIG. 3 is a schematic of an isotope separator which illustrates the relative parts.

DETAILED DESCRIPTION

Figure 1:
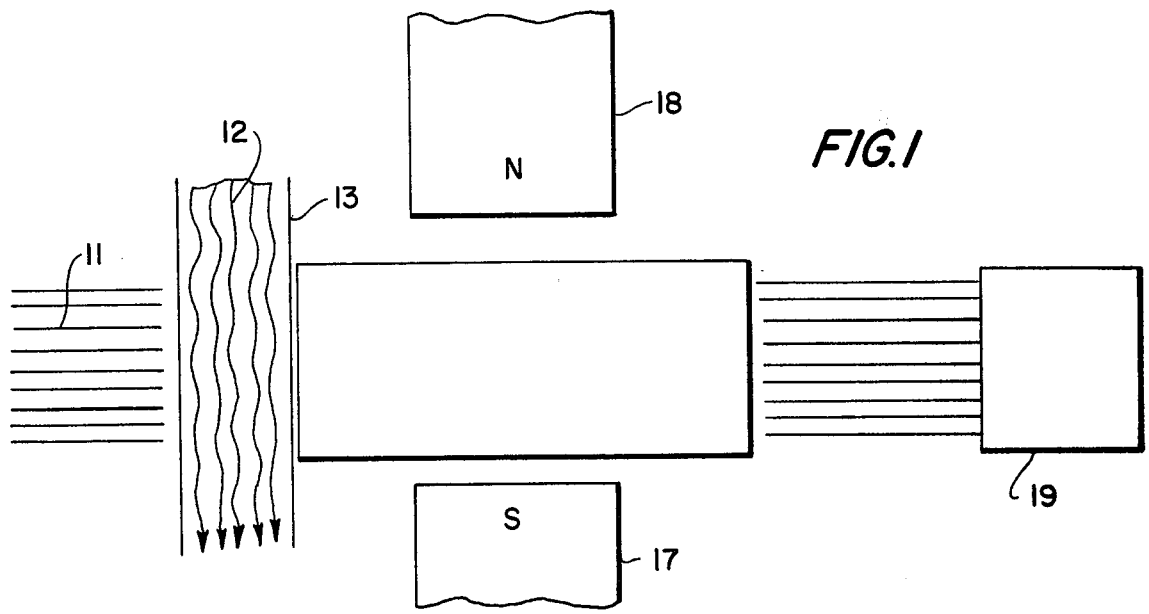
FIG. 1 is a schematic which illustrates the top view of a simplified isotope separator.
Figure 2:
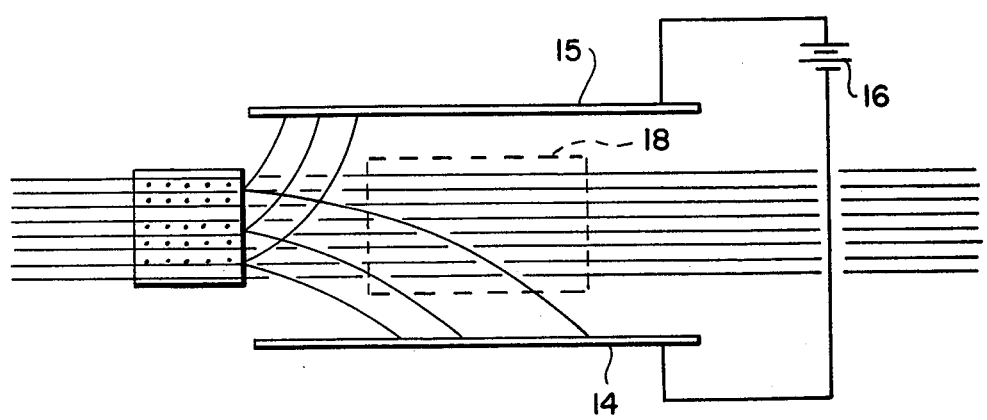
FIG. 2 is a schematic which illustrates a side view of the device shown in FIG. 1.

Now referring to the drawing, there is shown in FIGS. 1 and 2 a simplified isotope separator. As shown, the system includes an incoming neutral beam 11 of atoms of a vaporized element containing isotopes desired to be separated from the mixture. The incoming neutral beam is accelerated through a CW laser output beam 12 which passes through channel 13. The laser beam is formed by two separate continuous wave laser elements whose outputs are as nearly as possible in the same beam path. The beam 12 containing the two separate laser outputs is tuned to excite and ionize atoms of the isotope to be separated while leaving the atoms of the remaining isotopes unaffected during passage through the laser beam. After excitation and ionization of the atoms, there is a mixture of ions, electrons and neutrals. In order to separate the desired isotopes, the ions and electrons must be separated from the beam before recombination or any sequence of atomic processes resulting in ionization of a substantial number of undesired isotopes can take place.

The ions, electrons and neutral atoms are accelerated from the laser channel into an area in which the ions and electrons are electrostatically deflected from the beam by negative and positive plates, 14 and 15 respectively, which form a capacitor connected electrically to a voltage source 16. A magnetic field perpendicular to the electrostatic field is produced by permanent magnet poles 17 and 18. The unaffected atoms pass through the magnetic and electrostatic fields to a beam recovery device 19. During passage through the magneto-electric field the ions are attracted to the negatively charged plate and the electrons are attracted to the positively charged plate.

FIG. 3 illustrates a schematic of an isotope separator which makes use of two vapor beam sources 21, 22 and two pair of lasers 23, 24 such as described above for the device illustrated in FIG. 1, whose output beams propagate parallel with the capacitor collector plates 25 and transverse to the vapor beams. The vapor beams are directed toward each other at a slight angle relative to each other and perpendicular to respective laser beams with the beams intercepting each other at the center of the capacitor plates. A magnetic field is set up by a permanent magnet 26 with the magnetic field perpendicular to the length of the capacitor plates and across the beams. The area between the capacitor plates is enclosed by a vacuum chamber 27 into which the laser beams and vapor beams in each separate output path are injected. The laser beams operate in the CW mode, with as nearly as possible the same path. The drawing has been exaggerated in order to better illustrate the operation. The first vapor from beam source 21 passes through the combined laser output beam from laser pair 23 in which one laser output in the combined beam is strong enough to excite only those atoms of the isotope to be isolated and the other laser output in the beam ionizes only the excited atoms. Ionization is brought about since the laser that ionizes the atoms is of sufficiently short wavelength to excite transitions to the continuum from the excited state but not the ground state, and not resonant with any transition to an excited state of any isotope present and not excited. Since photo-excitation and photoionization times are both about $10^{-8}$ sec., ionization takes place simultaneously with excitation and little energy is lost via reradiation resulting from spontaneous or stimulated emission. Excitation and ionization energies required are about 5 eV per atom; therefore wavelengths near the ultraviolet limit of the visible spectrum are used. The vapor beam from beam source 22 passes through the combined laser output beam from the laser pair 24 and is excited and ionized as set forth above for the vapor beam from beam source 21.

As seen in the drawing, the two plasma beams interpenetrate in the area bounded by the capacitor plates 25; therefore strong electrostatic instabilities are developed. The instabilities saturate at large amplitudes, and the resulting spectrum of high frequency oscillations effectively scatters the streaming charged particles. Therefore the ions of the isotopes to be separated are effectively stopped by the resulting "anomalous drag" and are electrostatically deflected from the beam stream at low velocity. The electrons are collected by the positively charged plate, the ions are collected by the negatively charged plate and the neutral isotopes continue on through the system to the beam collectors 28, 29.

The length, width, and separation distance between the capacitor plates as well as the laser intensities and other parameters have been set forth in the publication: "Isotope Separation Using Magneto-plasma Instabilities", by David L. Book, NRL Memorandum Report 2908, published by the Naval Research Laboratory, Washington, D.C. 20375 and incorporated herein as a part of this specification.

In use of an isotope separator such as shown in FIG. 3, the ions are collected within a few centimeters of the center of the system in which the length of the capacitor plate is less then 10 cm. The ions are braked to effectively zero velocity before collection, thereby eliminating problems of impurities or damage to the collectors.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An isotope separator which comprises:
    a pair of spaced capacitor plates;
    a voltage source for applying a potential difference on said plates to produce an electrostatic field between said plates;
    a magnet for producing a magnetic field perpendicular to said electrostatic field;
    first and second neutral vapor beam accelerators which produce separate beams of atoms of an isotope to be separated from said beams,
    said beams directed at an angle relative to each other with their intersection in the area bounded by said capacitor plates;
    first laser means with its output directed in a beam perpendicular to said first neutral vapor beam which passes therethrough; and
    second laser means with its output directed in a beam perpendicular to said second neutral vapor beam which passes therethrough,
    each of said first and second laser output beams exciting and ionizing said vapor beams passing therethrough to produce ions and electrons amoung neutrals which interpenetrate in the area bounded by said capacitor plates to produce plasma instabilities,
    whereby said ions are collected by one capacitor plate, said electrons are collected by the other capacitor plate and said neutrals pass through the spacing between said capacitor plates and are collected by a beam recovery means outside of said capacitor plate pair.

2. An isotope separator as claimed in claim 1; which includes,
    a vacuum chamber which incloses the area between said capacitor plates.

3. A method of separating an isotopic species of a given element from a mixture which comprises:
    directing a first beam containing a mixture of isotopes toward an area bounded by spaced capacitor plates;
    directing a second beam containing a mixture of isotopes toward said first beam to intersect said first beam at an angle relative thereto in an area bounded by said capacitor plates;
    exciting and ionizing said first and second beams before intersection of said beams to form a plasma containing ions, electrons, and neutrals;
    applying a magnetic field across the area bounded by said capacitor plates; and
    applying a voltage source to said capacitor plates,
    whereby ion scattering is induced by plasma instabilities in the area bounded by said capacitor plates, and said ions are collected by one capacitor plate, said electrons are collected by the other capacitor plate and said neutrals are recovered outside of said capacitor plates.

* * * * *